United States Patent
Park

(10) Patent No.: US 11,239,517 B2
(45) Date of Patent: Feb. 1, 2022

(54) BATTERY ASSEMBLY MODULE

(71) Applicant: HYUNDAI MOBIS CO., LTD., Seoul (KR)

(72) Inventor: Ho Jin Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 73 days.

(21) Appl. No.: 16/776,223

(22) Filed: Jan. 29, 2020

(65) Prior Publication Data

US 2020/0243811 A1    Jul. 30, 2020

(30) Foreign Application Priority Data

Jan. 29, 2019  (KR) ......................... 10-2019-0011509

(51) Int. Cl.

| | |
|---|---|
| *H01M 50/15* | (2021.01) |
| *H01M 50/166* | (2021.01) |
| *H01M 10/42* | (2006.01) |
| *H01M 50/531* | (2021.01) |

(52) U.S. Cl.
CPC ....... *H01M 50/166* (2021.01); *H01M 10/425* (2013.01); *H01M 50/15* (2021.01); *H01M 50/531* (2021.01); *H01M 2010/4271* (2013.01)

(58) Field of Classification Search
None
See application file for complete search history.

(56) References Cited

U.S. PATENT DOCUMENTS

| | | | |
|---|---|---|---|
| 2012/0212232 A1* | 8/2012 | Ikeda | H01M 10/482 324/426 |
| 2016/0172654 A1* | 6/2016 | Lee | B60L 50/64 429/7 |
| 2017/0187084 A1* | 6/2017 | Park | H01M 10/647 |
| 2020/0144582 A1* | 5/2020 | Guo | H01M 50/54 |

FOREIGN PATENT DOCUMENTS

KR    10-2015-0104733 A    9/2015

* cited by examiner

*Primary Examiner* — Lisa S Park
(74) *Attorney, Agent, or Firm* — Morgan, Lewis & Bockius LLP

(57) ABSTRACT

A battery assembly module according to one embodiment of the present invention includes an upper cover having coupling holes formed at a plurality of locations therein, a lower cover disposed to correspond to the upper cover and having coupling holes formed at a plurality of locations therein, a plurality of pouch cells to which electrodes are connected to one side and the other side thereof and which store or supply electricity, a plurality of cartridges stacked and accommodating the plurality of pouch cells, and a plurality of caulking pipes fixedly coupling the plurality of cartridges accommodating the pouch cells between the upper cover and the lower cover.

12 Claims, 5 Drawing Sheets

BATTERY ASSEMBLY MODULE

CROSS-REFERENCE TO RELATED APPLICATION

This application claims priority to and the benefit of Korean Patent Application No. 10-2019-0011509, filed on Jan. 29, 2019, the disclosure of which is incorporated herein by reference in its entirety.

BACKGROUND

1. Field of the Invention

The present invention relates to a battery technology and to a battery assembly module in which battery cells are stacked and assembled to provide a driving force to a vehicle.

2. Discussion of Related Art

Generally, all hybrid vehicles, fuel cell vehicles, and electric vehicles are equipped with electric motors for driving and are equipped with high voltage batteries which provide driving power to the electric motors.

The high voltage battery includes a plurality of battery modules which are repeatedly charged and discharged to supply power while driving the vehicle. Each of the plurality of battery modules includes a plurality of battery sub-modules, and each of the sub-modules includes a pair of battery cells.

Battery cells of the high voltage battery may be manufactured in various types, and among the various types of the battery cells, pouched type high voltage battery cells which are light and flexible because aluminum laminate sheets are used as exterior members attract attention.

The pair of high voltage battery cells are disposed between an upper cell cover and a lower cell cover. The upper and lower cell covers are formed as a plurality of upper and lower cell covers according to the number of the high voltage battery sub-modules and are stacked in a direction in which surfaces are in contact with each other.

In the battery module, a voltage sensor is connected to each of the battery cells to sense a voltage.

The conventional voltage sensor is divided into a cell tab (Al and Cu) and voltage sensing busbar triple welding type voltage sensor or a cell tab (Al and Cu) and receptacle type voltage sensor according to a kind of sensing of a cell voltage of each of the battery modules.

Since a cell tab (Al and Cu) and voltage sensing busbar triple welding type battery module for an electric vehicle needs to sense a voltage of each unit cell, voltage sensing busbars are welded to both terminals (cell tabs) of each cell connected in series by a laser to sense a voltage of the unit cell. The voltage sensing busbars are triple welded to two cell tabs (Al and Cu).

When triple welding aluminum (positive electrode), copper (negative electrode), and copper (voltage sensing busbar), it is very difficult to set initial welding conditions in a mass production line. In addition, even after setting the welding conditions, a quality problem may occur due to a dimensional distribution, a surface state of the cell tabs, and an angle of the cell tabs of an assembled product.

The bus bar triple welding is a process in which quality defects (weak welding, porosity, etc.) occur most frequently in a battery module manufacturing process, it is difficult to secure quality, and mechanical equipment and a space in the product are needed such that three materials are properly in contact with each other for the triple welding.

Although welding is one of the most reliable bonding technologies now, the triple welding tends to be avoided for the battery cell voltage sensor due to the above reasons.

Meanwhile, "BATTERY MODULE HAVING VOLTAGE SENSING MEMBER WITH RECEPTACLE STRUCTURE" is disclosed in LG Chem's patent application No. 110-2014-0026422 for a cell tab (Al and Cu) and receptacle type.

In such a conventional technology, tweezer type (receptacle) terminals may be assembled to Cu and Al cell tabs which are welded first to avoid the triple welding, but there is a disadvantage in that a receptacle structure is weak to vibration and difficult to assemble.

In addition, in the receptacle type voltage sensing busbar, since the receptacle terminals are weak to vibration impact, there is little history of the receptacle type voltage sensing busbar having been used after being applied to batteries of some kinds of vehicles, and since assemblability of the receptacle to the cell tabs is low, there is a high possibility of production defects.

SUMMARY OF THE INVENTION

The present invention is directed to providing a battery assembly module capable of being made by omitting a welding process, removing an unnecessary space for welding inspection in a product, improving quality, stably sensing in vibration/impact conditions, and reducing the number of manufacturing processes, a process cycle time, and a cost, unlike a conventional voltage sensing method using triple welding, a receptacle type, or the like.

According to an aspect of the present invention, there is provided a battery assembly module including an upper cover having coupling holes formed at a plurality of locations therein, a lower cover disposed to correspond to the upper cover and having coupling holes formed at a plurality of locations therein, a plurality of pouch cells to which electrodes are connected to one side and the other side thereof and which store or supply electricity, a plurality of cartridges alternately and vertically male-female-coupled, stacked between the upper cover and the lower cover, and provided to have different forms to accommodate the pouch cells, and a plurality of caulking pipes which are inserted into the corresponding coupling holes disposed at the plurality of locations in the upper cover and the corresponding lower cover and vertically pass through some of the plurality of cartridges to be coupled to the upper cover and the lower cover.

As second cartridges are each disposed to be inserted into an upper portion and a lower portion of the first cartridge so that the pouch cells in the lower and upper portions of the first cartridge may be accommodated between the first cartridges and the second cartridges.

The plurality of pouch cells may be connected in series by vertically and alternately placing one side electrode and the other side electrode, which have different polarities, of each of the plurality of pouch cells so that the electrodes are in contact with a voltage sensing busbar and an electrode connector.

The one side electrode and the other side electrode of the pouch cell may have forms bent upward and downward in opposite directions, and the one side electrode of one pouch cell and the other side electrode of another pouch cell cover may surround and be in contact with an upper portion and a lower portion of the voltage sensing busbar.

The first cartridge may include a first quadrilateral frame in which a partial region corresponding to the pouch cell and passing through the first quadrilateral frame is formed in a quadrilateral form and a fixing groove male-female-coupled with the second cartridge is provided at an edge of the first quadrilateral frame, and a bushing hole which is connected to a quadrilateral corner side of the first quadrilateral frame, into which the caulking pipe is inserted, and through which the caulking pipe passes, and the second cartridge may include a second quadrilateral frame in which a partial region corresponding to the pouch cell passes through the second quadrilateral frame, is formed in a quadrilateral form, and is inserted into the fixing groove of the edge of the first quadrilateral frame, and support bars disposed at intervals to support the pouch cell on the second quadrilateral frame.

The edges of the first quadrilateral frame and the second quadrilateral frame may be provided with a plurality of bent sections which are correspondingly male-female-coupled therewith and prevent a slipping movement in a longitudinal direction.

The battery assembly module may further include a connecting hook member disposed to be inserted into the bent sections and connected to the upper cover and the lower cover, wherein the bent sections of the plurality of the first cartridges and the second cartridges may be vertically connected.

A bus holder into which the voltage sensing busbar is fixedly inserted may be provided in a side portion of the first quadrilateral frame, a contact protrusion having a semicircular form may be formed on the voltage sensing busbar in a longitudinal direction, and a pressing protrusion corresponding to the contact protrusion may be formed under the pressing part.

A screw hole for screw coupling may be provided in a side portion of the bushing hole of the first cartridge.

A honeycomb groove having a honeycomb shape may be provided in an upper surface portion of the upper cover, an upper surface of the pouch cell may be accommodated in a lower surface portion of the upper cover, a lower surface portion of the pouch cell may be accommodated in an upper surface portion of the lower cover, and a power terminal may be provided on one cartridge, which is disposed adjacent to the upper cover, of the plurality of cartridges.

The battery assembly module may further include a sensing line connected to the voltage sensing busbar, and a battery controller connected to the sensing line.

The plurality of cartridge may include a first cartridge having one side provided with a voltage sensing busbar for sensing a voltage and a second cartridge having one side provided with a pressing part corresponding to the voltage sensing busbar and the other side provided with an electrode connector, wherein, the pressing part is pressed due to coupling of the caulking pipe, one side electrode of one pouch cell and one side electrode of another pouch cell may be in contact with the voltage sensing busbar of the first cartridge, and the other side electrode of the one pouch cell may be connected to the electrode connector.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
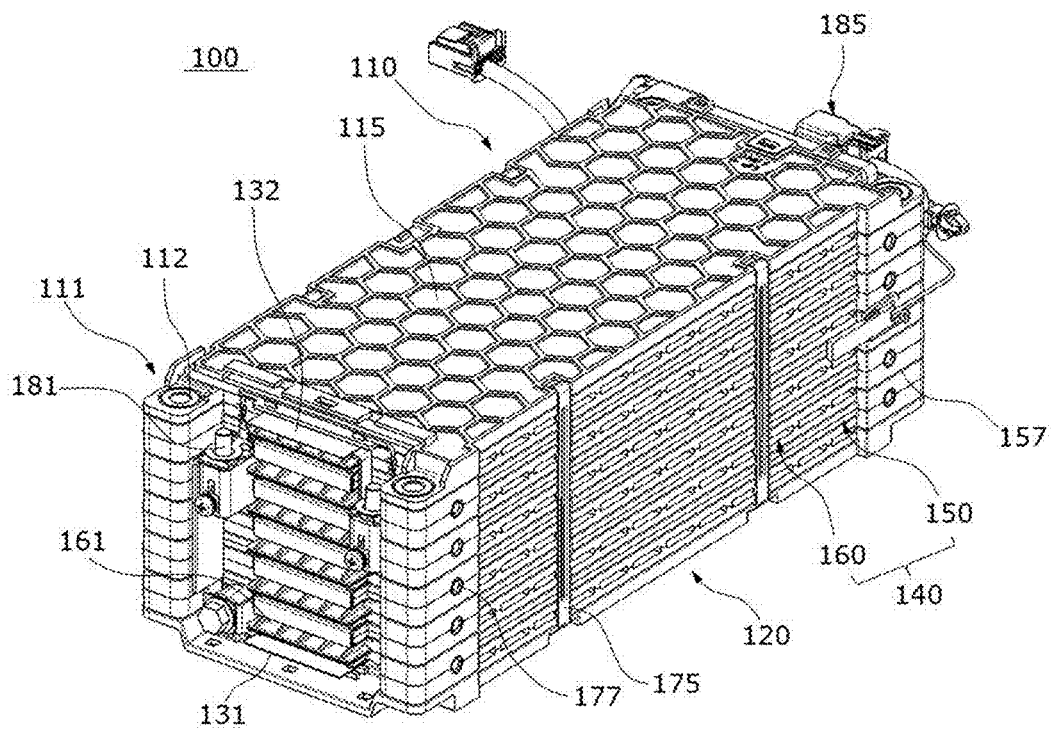
FIG. 1 is a three-dimensional view illustrating a battery assembly module according to one embodiment of the present invention.

Hereinafter, various embodiments of the present invention will be described with reference to specific embodiments illustrated in the accompanying drawings. It should be understood that differences in the embodiments are not exclusive, and a specific form, a structure, or a feature described in one embodiment may be realized in another embodiment without departing from the spirit and scope of the present invention.

Referring to FIG. 1 to FIG. 4, a battery assembly module 100 according to one embodiment of the present invention includes an upper cover 110 having coupling holes 101 disposed at a plurality of locations therein, a lower cover 120 which is disposed to correspond to the upper cover 110 and has coupling holes 101 disposed at a plurality of locations therein, a plurality of pouch cells 130 to which electrodes 131 and 132 are connected at one side and the other side thereof and which store or supply electricity, a plurality of cartridges 140 which accommodate the plurality of pouch cells 130 and are stacked, and a plurality of caulking pipes 170 which couple and fix the plurality of cartridges 140 accommodating the pouch cells 130 between the upper cover 110 and the lower cover 120.

The upper cover 110 and the lower cover 120 are formed of plates having a quadrilateral form, and pairs of coupling holes 101 are formed in both sides thereof. Metal rings 120 capable of being in contact with and supporting the caulking pipes 170 when coupling is performed through a caulking process are disposed in the coupling holes 101.

Honeycomb grooves 105 having a honeycomb shape are provided in an upper surface portion of the upper cover 110. A lower surface portion of the upper cover 110 is formed to accommodate an upper surface portion of the pouch cell 130 disposed at an uppermost position of the battery assembly module 100.

An upper surface portion of the lower cover 120 is formed to accommodate a lower surface portion of the pouch cell 130 disposed at a lowermost position of the battery assembly module 100.

The pouch cells 130 are accommodated in the plurality of cartridges 140, the plurality of cartridges 140 are sequentially disposed and stacked on the lower cover 120, and, when the upper cover 110 is disposed on the plurality of cartridges 140, the caulking pipes 170 are inserted into the coupling holes 101 and a coating process is finally performed on the battery assembly module 100 to completely assemble the battery assembly module 100.

The caulking pipes 170 are inserted into the coupling holes 101 disposed at the plurality of locations corresponding to the upper cover 110 and the lower cover 120, vertically pass through some of the plurality of cartridges 140, and are coupled to the upper cover 110 and the lower cover 120 by performing a caulking process.

The illustrated caulking pipe 170 has an upper end portion and a lower end portion which are widen by performing the caulking process. Before the caulking process, the upper end portion and the lower end portion have a form having a narrow radius sufficient for being inserted into the coupling hole 101. Although the coupling hole of the lower cover 120 is not illustrated in the drawing, the coupling hole of the lower cover 120 has a shape the same as a shape of the coupling hole 101 of the upper cover 110.

The plurality of cartridges 140 are alternately and vertically male-female-coupled and stacked between the upper cover 110 and the lower cover 120 and provided to have different forms to accommodate the pouch cells 130.

Hereinafter, the pouch cells and the plurality of cartridges according to one embodiment of the present invention will be described in more detail.

Referring to FIGS. 2 to 5, in the pouch cell 130, when the one side electrode 131 disposed at one side of the pouch cell 130 is a positive electrode, the other side electrode 132 disposed at the other side thereof is a negative electrode.

One side electrode 131 and the other side electrode 132 of the pouch cell 130 have forms bent upward and downward in opposite directions. The one side electrode 131 of one pouch cell 130 and the one side electrode 132 of another pouch cell 130 surround and are in contact with upper and lower portions of an voltage sensing busbar 151 and are in firm contact with the voltage sensing busbar 151 due to a pressing part 161, which will be described below, receiving a coupling force from the caulking pipe 170.

Referring to FIGS. 2 to 4 and 6, the plurality of cartridges 140 include a first cartridge 150 having one side provided with the voltage sensing busbar 151 for voltage sensing and a second cartridge 160 having one side provided with the pressing part 161 to correspond to the voltage sensing busbar 151 and the other side provided with an electrode connector 163.

As the second cartridges 160 are each disposed to be inserted into an upper portion and a lower portion of the first cartridges 150, the pouch cells 130 in the lower and upper portions of the first cartridge 150 may be accommodated between the first cartridge 150 and the second cartridges 160.

Since the upper cover 110 and the lower cover 120 are coupled using the caulking pipes 170, a coupling pressure is vertically applied to the first cartridge 150 and the second cartridge 160 due to the caulking pipes 170. Accordingly, a state in which the pouch cells 130 are accommodated between the first cartridge 150 and the second cartridge 160 is firmly maintained.

Since the pressing part 161 is pressed due to the first cartridge 150 and the second cartridge 160 being coupled using the caulking pipes 170, the one side electrode 131 of one pouch cell 130 and the one side electrode 132 of another pouch cell 130 are in contact with the voltage sensing busbar 151 of the first cartridge 150, and the electrodes 131 and 132 of one pouch cell 130 and another pouch cell 130, which are vertically disposed, are in contact with the electrode connector 163 and are connected to each other.

As described above, the voltage sensing busbar 151 of the first cartridge 150 for sensing a voltage of the pouch cell 130 is naturally in contact with and is connected to the electrodes 131 and 132 of the pouch cell 130 due to the pressing part 161 receiving a coupling force for coupling the upper cover 110 and the lower cover 120. The above described present invention provides a connecting structure and an operational advantage departing from a conventional welding, a receptacle structure, and related works.

In the battery assembly module 100 according to one embodiment of the present invention, the electrodes 131 and 132 of the plurality of pouch cells 130 are connected in series alternately in vertical and lateral directions. The series connection of the pouch cells 130 is performed by vertically and alternately placing the one side electrodes 131 and the other side electrodes 132, which have different polarities, so that the one side electrodes 131 and the other side electrodes 132 are in contact with the voltage sensing busbars 151 and the electrode connectors 163.

Figure 3:
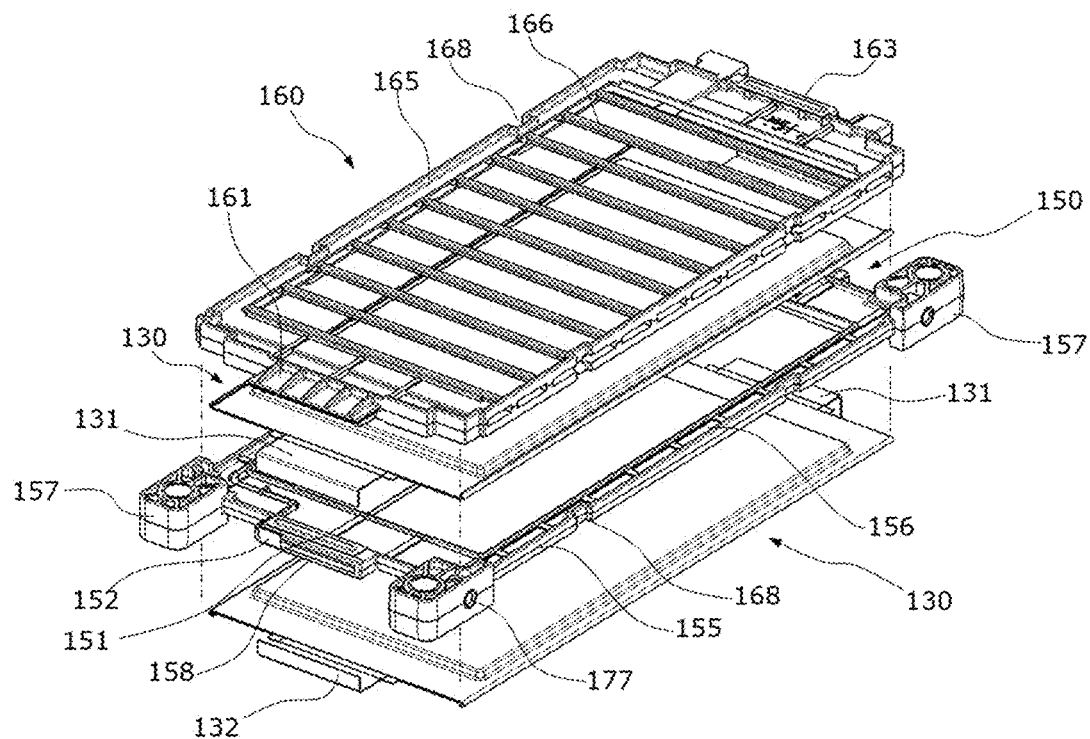
FIG. 3 is an exploded view illustrating a plurality of cartridges and pouch cells of FIG. 2.
Figure 6:
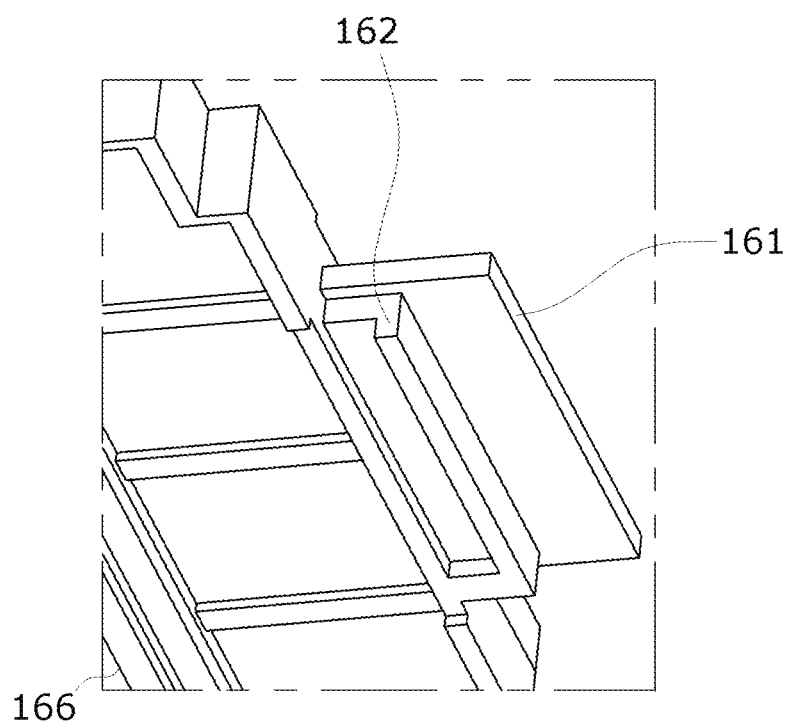
FIG. 6 is a detailed view illustrating a second cartridge and a pressing part of FIG. 2.

Referring to FIGS. 3 and 6, contact protrusions 152 having a semicircular form may be provided on the voltage sensing busbar 151 in a longitudinal direction, and pressing protrusions 162 corresponding to the contact protrusion 152 may be provided on a lower portion of the pressing part 161. The pressing protrusion 162 of the pressing part 161, the electrodes 131 and 132, and the contact protrusion 152 of a contact portion are vertically and linearly disposed and are in contact with each other.

Figure 2:
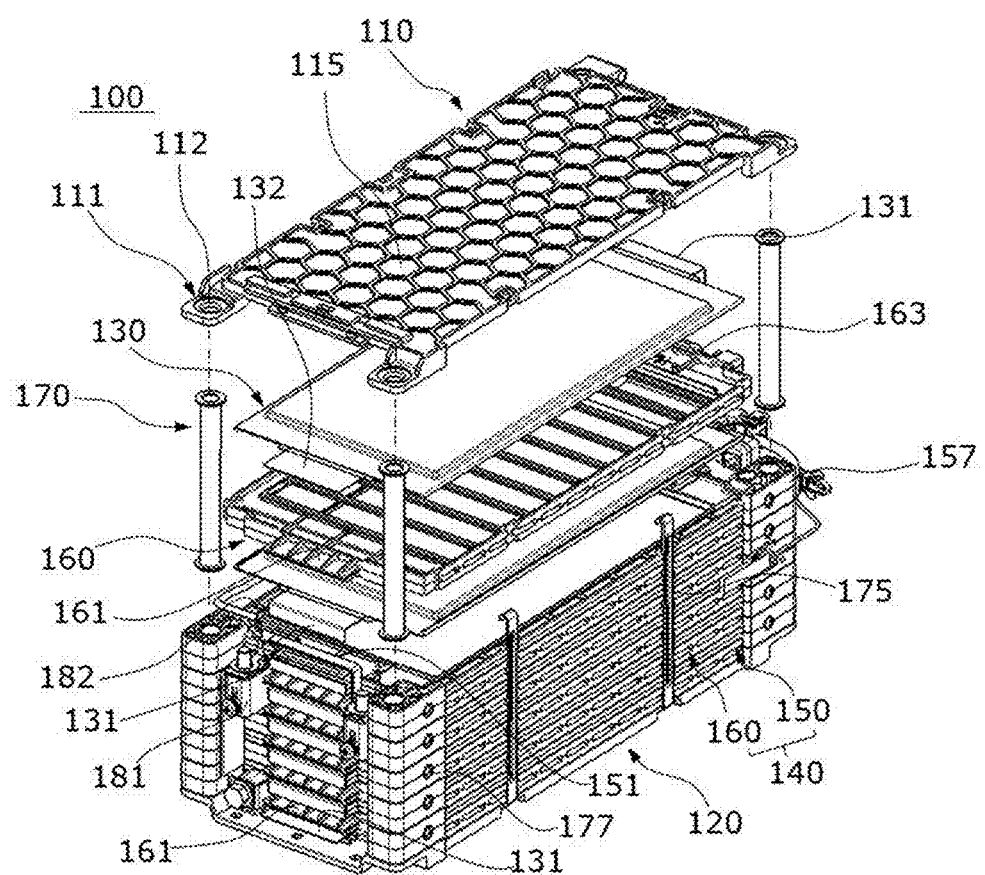
FIG. 2 is an exploded view illustrating an upper cover of FIG. 1.
Figure 4:
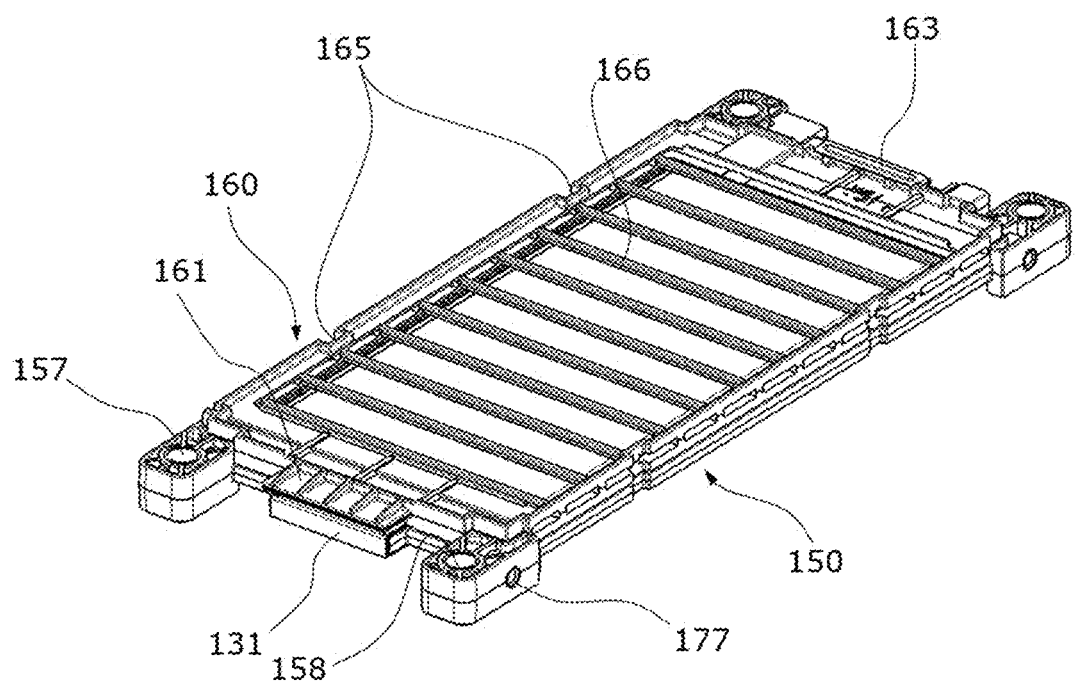
FIG. 4 is an assembly view of FIG. 3.
Figure 5:
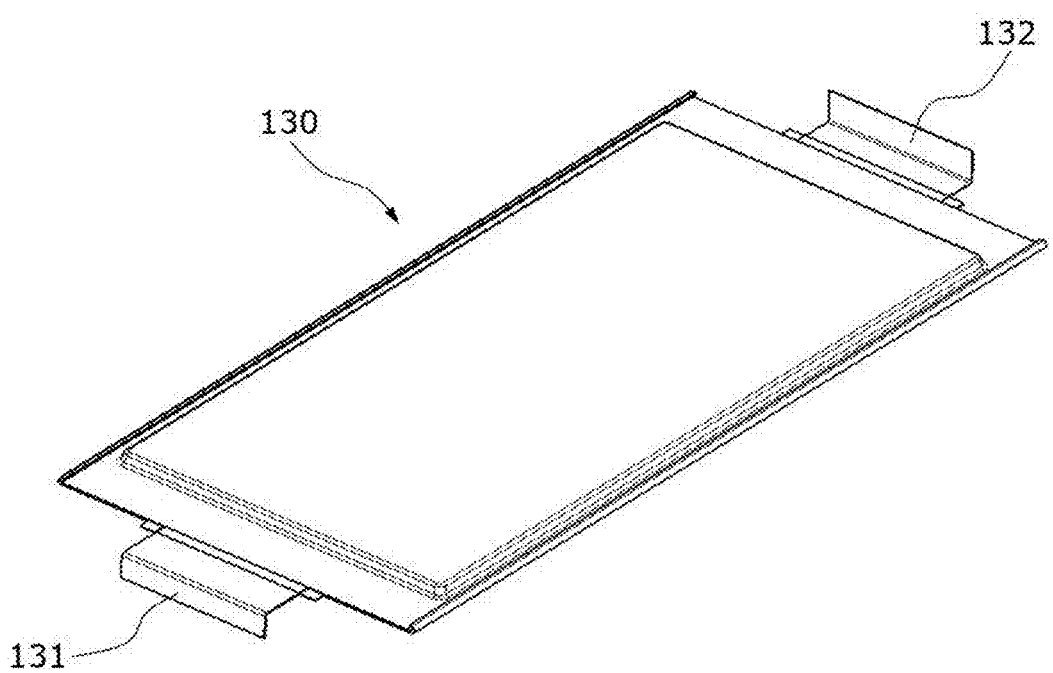
FIG. 5 is a view illustrating the pouch cell of FIG. 2.

Referring to FIGS. 2 to 4, the first cartridge 150 includes a first quadrilateral frame 155 in which a partial region corresponding to the pouch cell 130 and passing through the first quadrilateral frame 155 is formed in a quadrilateral form and a fixing groove 156 male-female-coupled to the second cartridge 160 is provided at an edge of the first quadrilateral frame 155, and bushing holes 157 which are connected to quadrilateral corner sides of the first quadrilateral frame 155, into which the caulking pipes 170 are inserted, and through which the caulking pipes 170 pass.

The first quadrilateral frame 155 has a form in which the pouch cells 130 are disposed and accommodated in an upper surface portion and a lower surface portion of the first quadrilateral frame 155 and has a structure in which the second quadrilateral frame 165 may be male-female-coupled with the first quadrilateral frame 155 along the edge of the first quadrilateral frame 155.

A bus holder 158 into which the voltage sensing busbar 151 is fixedly inserted is provided at a side portion of the first quadrilateral frame 155.

Referring to FIG. 6 again, the second cartridge 160 includes a second quadrilateral frame 165 in which a partial region corresponding to the pouch cell 130 passes through the second quadrilateral frame 165 in a quadrilateral form and is inserted into the fixing groove 156 of the edge thereof, and support bars 166 disposed at intervals to support the pouch cell 130 on the second quadrilateral frame 165.

The second quadrilateral frame 165 separates the pouch cells 130 accommodated in the upper surface portion and the lower surface portion of the second cartridge 160 using the support bars 166.

The plurality of support bars 166 are disposed in a lateral direction of the second quadrilateral frame 165 and disposed at a distance in a longitudinal direction of the second quadrilateral frame 165. The support bars 166 support a thin edge of the second quadrilateral frame 165 to provide tensile, compression, and torsional rigidity capable of maintaining accommodation of the pouch cell 130.

Meanwhile, referring to FIGS. 1 to 3, the edges of the first quadrilateral frame 155 and the second quadrilateral frame 165 may be provided with a plurality of bent sections 168 which are correspondingly male-female-coupled therewith and prevent a slipping movement in the longitudinal direction.

Since the bent sections 168 of the second quadrilateral frame 165 are inserted into and disposed at the corresponding bent sections 168 of the first quadrilateral frame 155, the second quadrilateral frame 165 and the first quadrilateral frame 155 may be vertically separated at the edges thereof, but the slipping movement is limited in the longitudinal direction of the edge.

The battery assembly module 100 according to one embodiment of the present invention further includes connecting hook members 175 by which the plurality of first cartridges 150 and the plurality of second cartridges 160 are vertically connected through the bent sections 168, and which are disposed to be inserted into the bent sections 168, and are connected to the upper cover 110 and the lower cover 120.

Since the connecting hook members 175 are vertically coupled to the upper cover 110 and the lower cover 120 at a sidewall of the battery assembly module 100 of which corners are coupled using the caulking pipes 170, a stack structure having a substantially rectangular form is stably formed.

Screw holes 177 for screw coupling may be provided in sides of the bushing holes 157 of the first cartridge 150. The screw holes 177 may be used for fixedly installing or mutually connecting battery assembly modules 100.

A power terminal 181 may be provided on the second cartridge 160 which is disposed at an upper portion of the battery assembly module 100 and is one of the plurality of cartridges 140 disposed adjacent to the upper cover 110. The power terminal 181 is used for connection of a cable for supplying driving power.

The battery assembly module according to one embodiment of the present invention may further include a sensing line 182 connected to the voltage sensing busbar 151 and a battery controller 185 connected to the sensing line 182.

The battery controller 185 is connected to the voltage sensing busbar 151 and may serve to prolong a lifetime of the pouch cell 130 or to inform a user of a replacing and checking time of the pouch cell 130 by checking power of the pouch cell 130, collecting information about the power, transmitting the information to an external main controller, or by averagely and integrally controlling a voltage of the pouch cell 130.

As described above, the present invention can provide a battery assembly module capable of being made by omitting a welding process, removing an unnecessary space for welding inspection in a product, improving quality, stably sensing under vibration/impact conditions, and reducing the number of manufacturing processes, a process cycle time, and a cost by using a pressing force of a caulking pipe included in a stack type battery assembly module which strongly presses cell tabs against voltage sensing busbars at the same time of assembly unlike a conventional voltage sensing method using triple welding, a receptacle type, or the like.

What is claimed is:

1. A battery assembly module comprising:
   an upper cover including first coupling holes defined at a plurality of locations of the upper cover;
   a lower cover disposed to correspond to the upper cover, the lower cover including second coupling holes defined at a plurality of locations of the lower cover;
   a plurality of pouch cells, to each of which first and second electrodes are connected to a first side and a second side of the corresponding pouch cell, respectively, the plurality of pouch cells configured to selectively store and supply electricity;
   a plurality of cartridges alternately and vertically male-female-coupled, stacked between the upper cover and the lower cover, the plurality of cartridges having different shapes to accommodate the plurality of pouch cells; and
   a plurality of caulking pipes extending through the corresponding first and second coupling holes disposed at the plurality of locations in the upper cover and the corresponding lower cover, respectively, the plurality of caulking pipes vertically passing through some of the plurality of cartridges to be coupled to the upper cover and the lower cover,
   wherein the plurality of cartridges include first cartridges and second cartridges, and
   wherein first electrode and second electrode have shapes bent upward and downward, respectively, in opposite directions, such that first electrode of one pouch cell and second electrode of another pouch cell disposed below the one pouch cell are configured to, when assembled, surround a voltage sensing busbar of a first cartridge that is disposed between the one pouch cell and the another pouch cell.

2. The battery assembly module of claim 1, wherein each of the second cartridges extends through an upper portion and a lower portion of one of the first cartridges so that the plurality of pouch cells in the lower and upper portions of the first cartridges are accommodated between the first cartridges and the second cartridges.

3. The battery assembly module of claim 2, wherein the plurality of pouch cells are connected in series in a way that first electrode and second electrode are vertically and alternately disposed first electrode and second electrode having different polarities from each other, so that first and second electrodes are in contact with the voltage sensing busbar and an electrode connector, respectively.

4. The battery assembly module of claim 3,
   wherein first electrode of one of the plurality pouch cells and second electrode of another of the plurality pouch cells are in contact with an upper portion and a lower portion of the voltage sensing busbar.

5. The battery assembly module of claim 2, wherein the first cartridge includes a first quadrilateral frame in which a partial region corresponding to the pouch cell and passing through the first quadrilateral frame is formed in a quadrilateral form and a fixing groove male-female-coupled with the second cartridge is provided at an edge of the first quadrilateral frame, and a bushing hole which is connected to a quadrilateral corner side of the first quadrilateral frame, into which the caulking pipe is inserted, and through which the caulking pipe passes, and
   wherein the second cartridge includes a second quadrilateral frame in which a partial region corresponding to the pouch cell passes through the second quadrilateral frame, is formed in a quadrilateral form, and is inserted into the fixing groove of the edge of the first quadrilateral frame, and support bars disposed at intervals to support the pouch cell on the second quadrilateral frame.

6. The battery assembly module of claim 5, wherein the edges of the first quadrilateral frame and the second quadrilateral frame are provided with a plurality of bent sections which are correspondingly male-female-coupled therewith and prevent a slipping movement in a longitudinal direction.

7. The battery assembly module of claim 6, further comprising a connecting hook member disposed to be inserted into the bent sections and connected to the upper cover and the lower cover, wherein the bent sections of the plurality of the first cartridges and the second cartridges are vertically connected.

8. The battery assembly module of claim 5, further comprising:
   a bus holder into which the voltage sensing busbar is fixedly inserted is provided in a side portion of the first quadrilateral frame;
   a contact protrusion having a semicircular form is formed on the voltage sensing busbar in a longitudinal direction; and
   a pressing protrusion corresponding to the contact protrusion is formed under the pressing part.

9. The battery assembly module of claim 5, further comprising a screw hole for screw coupling defined in a side portion of the bushing hole of the first cartridge.

10. The battery assembly module of claim 1, further comprising:
    a honeycomb groove having a honeycomb shape is provided in an upper surface portion of the upper cover;
    an upper surface portion of the pouch cell is accommodated in a lower surface portion of the upper cover;
    a lower surface portion of the pouch cell is accommodated in an upper surface portion of the lower cover; and
    a power terminal is provided on one cartridge, which is disposed adjacent to the upper cover, of the plurality of cartridges.

11. The battery assembly module of claim 10, further comprising:
    a sensing line connected to the voltage sensing busbar; and
    a battery controller connected to the sensing line.

12. The battery assembly module of claim 1, wherein the plurality of cartridges include:
    a first cartridge having a voltage sensing busbar at one side for sensing a voltage; and
    a second cartridge having a pressing part, which corresponds to the voltage sensing busbar, at a first side of the second cartridge and an electrode connector at a second side of the second cartridge,
    wherein, the pressing part is configured to be pressed due to coupling of the caulking pipe, first electrode of one pouch cell and first electrode of another pouch cell are in contact with the voltage sensing busbar of the first cartridge, and second electrode of the one pouch cell is connected to the electrode connector.

* * * * *